2,976,206

PESTICIDAL COMPOSITION

Edward C. Baillie, Moorestown, and Lewis F. Stevens, Haddonfield, N.J., assignors to Pittsburgh Plate Glass Company, Allegheny County, Pa., a corporation of Pennsylvania No Drawing. Filed Jan. 29, 1957, Ser. No. 636,880

3 Claims. (Cl. 167—20)

This invention relates to pesticidal compositions for treating vegetation and it has particular relation to a pesticidal composition for treating vegetation of the Malaceae family, such as common apple trees or the like and fruits and blooms thereof. Trees and shrubs of the malaceae family and fruits thereof have numerous enemies, such as apple scab, apple cedar rust and apple powdery mildew. Valuable dusts and sprays have been developed for treating these and other pests. However, no material as heretofore developed, has been entirely satisfactory because unfortunately, none of these is, as a single composition, entirely satisfactory as a control for all of the foregoing common pests to which the members of the Malaceae family are subject. Powdered sulfur for example will kill apple mildew. Ferric dimethyl dithiocarbamate, another common spray or dust material will kill apple cedar rust and 2,3-dichloro-1,4-naphthoquinone will kill apple scab, but none of these adequately retards or prevents the development of all of the foregoing pests.

Aside from their selective killing action for specific pests, each one when employed in effective dosage, is phytotoxic and tends to produce damage to the fruits of, or to the foliage of certain members of the Malaceae family, such as the apple tree. For example, they will produce objectionable russeting effects upon at least some important varieties of the common apple. Thus, sulfur will produce russeting of such important varieties as the Golden Delicious, Red Delicious and Stayman varieties. Ferric dimethyl dithiocarbamate will produce russeting of Golden Delicious and Stayman varieties. The 2,3-dichloro-1,4-naphthoquinone will produce russeting of Red Delicious and McIntosh. The foregoing russeting effects tend to reduce the salability of the fruit. Some, or all of these spray or dusting materials may also produce yellowing of young and tender foliage and twigs. This invention is based upon the discovery that when these several spray or dusting materials are thoroughly and intimately mixed as by blending them in proper proportions and then milling them to a very fine particle size while they are in the blended conditions, the mixture is substantially more effective against all of the foregoing pests than can be accounted for by considering the effects of components when applied singly in a conventional manner. Moreover, dosages which are highly effective against the pests, have but little or no phyto-toxic effect, such as the russeting of fruit or the yellowing of tender foliage. As a further feature, the invention comprises the discovery that the intimate mixtures of the several spray components are quite effective against mites, such as the so-called European red mite, whereas the components taken singly and in reasonable and safe proportions are not satisfactory as miticides, having only slight effect against the latter.

In preparing the spray and dusting materials of this invention, the proportions of the several ingredients constituting the novel combination fall approximately within the following ranges:

| | Parts by weight |
|---|---|
| Sulfur | 65–75 |
| Ferric dimethyl dithiocarbamate | 7–12 |
| 2,3-dichloro-naphthoquinone | 2–5 |

Various methods of grinding and mixing the several materials to obtain a highly uniform blend of fine particles may be employed. However, it is desirable that the method be capable of producing highly uniform blends in which all of the particles are reduced to as small an average diameter as is practicable. For example, it is desirable that the average particle size be not more than about 5 microns and preferably the average particle size is about 3.5 microns or lower. There apparently is no lower limit to the particle size except that imposed by the economics of milling.

The ingredients to be blended, namely, sulfur, ferric dimethyl dithio-carbamate and 2,3-dichloro-1,4-naphthoquinone should initially be in a more or less pulverulent state, though naturally they need not be in their ultimate particle size as obtained by the milling operation to which they are subjected in the practice of the present invention. A convenient apparatus for blending the powders preliminary to the milling operation may be a common ribbon blender comprising two helicies working in a common chamber and being adapted to convey the material to opposite ends of the chamber.

Powders of the sulfur, ferric dimethyl dithiocarbamate and 2,3-dichloro-1,4-naphthoquinone, when blended, may be ground in any convenient apparatus whereby they can be reduced to proper particle size and further highly intimately and uniformly mixed. However, excellent results may be obtained in a very economical manner by use of impact grinding in which the pulverulent materials while suspended in a gaseous medium, such as air are caused to impact particle against particle and also against retaining surfaces of the apparatus. Preferably, the medium carrying the powder is also caused to cycle in a spiral path at high velocity into a vortex. Appropriate apparatus for effecting this type of grinding is disclosed in Andrews Patent 2,032,827. This apparatus is but illustrative of possible forms of apparatus which may be employed in grinding the foregoing blend.

In a specific example illustrating the principles of the inveniton, a mixture was prepared comprising as active components.

| | Parts by weight |
|---|---|
| Sulfur | 71 |
| Ferric dimethyl dithiocarbamate | 9.5 |
| 2,3-dichloro-1,4-naphthoquinone | 3. |

For some applications, as for example, in dusting or in some types of spray applications, these several components may be blended as for example upon a ribbon blender as above described and then ground upon a mill such as the impact mill in the Andrews patent above referred to, without further additions until a suitable average size e.g. 3.5 microns is attained.

The foregoing all comprise the active pesticidal components. However, inert ingredients such as nonreactive pigments and fillers, e.g. clay, powdered soap, powdered silica, Epsom salts, dispersing and wetting agents such as methyl cellulose and dioctyl sodium sulfosuccinate and many others may be included in the mixtures either singly or as combinations of two or more or even all of the same. These may be incorporated for purposes of imparting to the blend certain desirable characteristics. They are particularly desirable where the mixture or blend is to be incorporated with spray materials containing insecticides or miticides of the phosphate type. These latter tend to produce objectionable foaming and flocculation if incorporated with sprays of the blends of sulfur, ferric dimethyl dithiocarbamate and 2,3-dichloro-1,4-naphthoquinone. A good mixture which adequately controls the dispersing and foaming of the foregoing blend of surfur, ferric dimethyl dithiocarbamate and 2,3-dichloro-1,4-naphthoquinone in the presence of phosphate containing spray materials comprises:

| | Parts by weight |
|---|---|
| Methyl cellulose | 0.16 |
| Powdered soap | 0.16 |
| Epsom salts | 2.5 |
| Clay | 10.3 |
| Dioctyl sodium sulfosuccinate | 0.25 |

These additions may be incorporated with the mixture of sulfur, ferric dimethyl dithiocarbamate and 2,3-dichloro-1,4-naphthoquinone at any appropriate stage. For example, they may be added in the ribbon blender already referred to, or the additions may be incorporated into the pre-formed blend of the primary pesticidal ingredients, or in a subsequent stage either before or after the grinding operation. Probably, best results are obtained, however, by blending all of the ingredients together at least before the grinding operation. The blend of active agents, either without or preferably with the incorporation of anti-foaming materials dispersing agents wetting agents, etc., are milled, preferably upon a mill of the type disclosed in the Andrews patent above described. Milling is continued until a particle size averaging below 5 microns and preferably 3.5 microns or below is attained.

An appropriate mixture of wetting agents of non-foaming constituents as well as the pesticidal components comprised:

| | Parts by weight |
|---|---|
| Sulfur | 71.31 |
| Ferric dimethyl dithiocarbamate (76% active) | 12.63 |
| 2,3-dichloro-1,4-naphthoquinone (95% active) | 3.19 |
| Methyl cellulose | 0.16 |
| Powdered soap | 0.16 |
| Epsom salts | 2.50 |
| Clay | 10.3 |
| Dioctyl sodium sulfosuccinate | 0.25 |

This mixture in pulverulent state was blended and the blend was ground upon the mill of the Andrews patent to an average particle size of about 3.5 microns. For purposes of convenience the mixture is hereinafter designated as S-mixture.

The mixture, with or without the antifoaming constituents, is exceedingly well adapted for application as a dust. Such application may be effected by means of a conventional duster of piston, or rotary blower type. For large scale application, it is often desirable to apply dust by airplane or helicopter in well known manner. The finely blended and powdered materials may also be made up into suspensions in aqueous media in well known manner for spray application. Effective dosages for spray application comprise about 3 to 6 pounds of the blend per 100 gallons of water. Very good results have been attained by use of about 4 pounds of the blend in the foregoing amount of water. The suspensions, preferably, are sprayed as fine mists upon the vegetation to be treated until the latter is well coated or even drips.

In order to establish the value of the blends of sulfur, ferric dimethyl dithiocarbamate, and 2,3-dichloro-1,4-naphthoquinone prepared in accordance with the provisions of the present invention as pesticides, aqueous sprays in recommended dosages of S-mixture and of a number of common commercial pesticides were prepared and were applied to members of the apple family in accordance with conventional testing procedure. The first of these tests was for apple scab and powdery mildew upon three year old trees. The data for these tests are tabulated as follows:

| Fungicidal treatment—Fungicide and rate | Scab, Leaves Infected | Powdery Mildew | |
|---|---|---|---|
| | | Leaves Infected | Severity Index |
| S-mixture, 4 lbs | 51 | 19 | 9 |
| Manzate, 1½ lbs | 37 | 33 | 41 |
| Dithane Z-78, 1½ lbs | 76 | 45 | 55 |
| Parzate, 1½ lbs | 55 | 30 | 30 |
| Sulfur, 6 lbs | 52 | 36 | 25 |
| Sulfur, 3 lbs.+captan, 1 lb | 38 | 21 | 17 |
| Sulfur, 3+Dithane Z-78, 1 lb | 40 | 17 | 23 |
| Fermate, 1½ lbs | 73 | 23 | 45 |
| No fungicide (control) | 76 | 38 | 31 |

Rates are in pounds (lbs.) per 100 gallons of water.

Manzate is understood to be manganese ethylene dithiocarbamate. Dithane is understood to be a trade name for the zinc manganese and sodium salts of ethylene dithiocarbamate. Parzate is understood to be disodium ethylene dithiocarbamate. Captan is understood to be N-trichloromethylmercapto-4-cyclohexene-1,2-dicarboximide. Its formula is understood to be:

$$C_9H_8O_2SCl$$

Fermate is understood to be ferric dimethyl dithiocarbamate and is the same as Ferbam.

Sulfur is 95% wettable pulverulent sulfur used for agricultural purposes.

Sprays were applied on May 1 (first leaves on Red Delicious full size), May 11 (terminal shoots 1 to 2 inches long), May 23 (shoots 4 to 6 inches long), June 6, June 15, June 28, July 11, July 25.

Average number of scab infected leaves and average number of scab lesions. Scab data were taken on 200 leaves per tree on 2 trees each of Red Delicious, Gallia Beauty and Rome Beauty varieties on July 5. Mildew data were taken on 5 basal leaves on 2 shoots per tree on 2 trees each of Gallia Beauty, Rome Beauty and Jonathan varieties on July 6. Mildew severity index is the average of ratings (0=no mildew, 100=severely mildewed) of mildew on 5 terminal shoots on each of two trees on each of the 3 varieties; Rome, Gallia Beauty and Jonathan on August 13.

A further test of S-mixture and Captan was conducted in which Golden Delicious and Red Delicious were sprayed with five sprays of 4 pounds (4 lbs.) of S-mixture in 100 gallons of water and then with 6 sprays of Captan as 2 pounds of 50 percent by weight mixture in 100 gallons of water. As a check, trees were also treated with 11 sprays of Captan. All of the sprays included 1½ pounds of Parathion of 15 percent by weight concentration as an insecticide.

Dates of spraying were on March 30 (dormant), April 9 (pink), April 19 (bloom), April 29 (petal fall), and subsequently on May 8, May 21, June 1, June 14, June 28, July 12 and July 26. The checks of percentages of leaves infected with scab and with rust were conducted. The inspections were upon the dates tabulated at the bottoms of the columns. The fruit was harvested upon September 4. These dates were all in 1956.

| Spray Treatment | Scab Index, G. Del. | Leaves Scab, R. Del. | Infected with— | | Rust lesions per 100 leaves |
|---|---|---|---|---|---|
| | | | Scab, G. Del. | Rust, G. Del. | |
| S-mixture (4 lbs.) (5 sprays), Captan (2 lbs.) (6 sprays) | 28.3 | 10.3 | 18.8 | 2.8 | 4.0 |
| Captan (50%), 2-100 (11 sprays) | 26.7 | 22.2 | 11.2 | 8.7 | 11.7 |
| No fungicide (control) | 97.5 | 34.7 | 75.8 | 13.8 | 31.8 |
| Inspection Dates | June 6 | June 1 | June 6 | June 17 | July 17 |

The results obtained with the S-mixture were substantially superior to those obtained by use of Captan alone. The latter is considered to be a control for apple scab only.

The fruits were largely free of russeting effects except such as could be attributed to Parathion. Captan and S-mixture compared favorably. Captan is known not to russet Golden Delicious unless used with Parathion. No russet occurred on Red Delicious. The amount of russeting was substantially the same for the Captan treatment as for the treatment where S-mixture was used.

In orchards where the S-mixture of this invention was used commercially, no appreciable russeting occurred on any of the major varieties of apples.

The following greenhouse tests of S-mixture and of 2,3-dichloro-1,4-naphthoquinone for control of apple powdery mildew upon apple seedlings were conducted. A blank test with distilled water was also conducted. The results were:

|  | Concentration Parts per million | Infection Rating |
|---|---|---|
| S-mixture | 4,000 | 2.1 |
| 2,3-dichloro-1,4-naphthoquinone | 150 | 45.8 |
| Control (Distilled water) |  | 93.0 |

The S-mixture was an effective control for apple powdery mildew. The 2,3-dichloro-1,4-naphthoquinone had only slight effect.

The S-mixture did not substantially yellow the foliage or stunt the seedlings.

The S-mixtures are also effective as miticides and will greatly retard the development of such mites as European red mites, as is established by the subsequent test. In this test, S-mixture was compared with finely ground sulfur and with ferric dimethyl dithiocarbamate.

Sprays upon apple trees were made upon the following dates May 15 and 24, June 4, 13 and 28 and July 14 and 27. Counts of mites per leaf were made July 16 and 30 and again on August 13. The data are as follows:

| Treatment | Lbs. per 100 gals. | Mites per leaf 7/16 | Mites per leaf 7/30 | Mites per leaf 8/13 |
|---|---|---|---|---|
| Micronized Sulfur | 5 | 3 | 6 | 48 |
| S-Mixture | 4 | 4 | 3 | 12 |
| Ferbam | 1½ | 11 | 14 | 49 |

It is apparent that in addition to being an excellent control for apple scab, apple cedar, rust, and apple powdery mildew, the S-mixture is also an effective control for European red mites. This constitutes an unusually great degree of versatility. It is atained with minimal amounts of the expensive organic materials namely ferric dimethyl dithiocarbamate and 2,3-dichloro-1,4-naphthoquinone in a mixture which comprises primarily inexpensive sulfur.

Other pesticides such as parathion previously alluded to and many others may be added to the mixtures of this invention. They may be added in the spray tank or may be blended as dry powders with the mixture of sulfur, ferric dimethyl dithiocarbamate and 2,3-dichloro-1,4-naphthoquinone either before or after the latter have been milled together.

Other metals such as zinc and manganese may replace the iron in the thiocarbamic acid salts. However, the ferric salts are presently preferred.

The forms of the invention herein disclosed are by way of example; it will be evident to those skilled in the art that many modifications may be made therein without departure from the spirit of the invention or the scope of the appended claims.

We claim:

1. A pesticidal composition which when applied to apple trees is effective to control European red mites, apple cedar rust, apple scab and apple powdery mildew, which comprises a uniform blend of about 65 to about 75 parts by weight of sulfur, about 7 to about 12 parts by weight of ferric dimethyldithiocarbamate, and about 2 to about 5 parts by weight of 2,3-dichloro-1,4-naphthoquinone, the blend being of an average particle diameter below about 5 microns.

2. A method of concurrently controlling apple scab, apple cedar rust, apple powdery mildew and European red mites upon apple trees, which comprises treating the trees with the pesticidal composition defined in claim 1.

3. A method of controlling apple scab, apple cedar rust, apple powdery mildew and European red mites upon apple trees, which comprises spraying the trees with a suspension comprising about 3 to about 6 pounds of the pesticidal mixture defined in claim 1 per 100 gallons of water.

References Cited in the file of this patent
UNITED STATES PATENTS

| 1,585,058 | Volck | May 18, 1926 |
| 2,145,259 | Heath | Jan. 31, 1939 |
| 2,243,544 | Horst | May 27, 1941 |
| 2,349,772 | Horst | May 23, 1944 |
| 2,430,722 | Ladd et al. | Nov. 11, 1947 |
| 2,457,674 | Heuberger | Dec. 28, 1948 |
| 2,579,429 | Hammer | Dec. 18, 1951 |
| 2,614,960 | Somerville | Oct. 21, 1952 |
| 2,741,573 | Kirchmeyer et al. | Apr. 10, 1956 |
| 2,771,389 | Dye | Nov. 20, 1956 |

OTHER REFERENCES

Wadley: The Evid. Required to Show Synergistic Action of Insecticides and a Short Cut in Analysis, USDA, June 1945.

King: Chems. Evaluated as Insecticides, U.S.D.A., Handbook, vol. 69, page 237, item No. 7361, May 1954.

Phytopathology, vol. 44, page 387, 1954.

Agr. Chemicals, 9 (3) page 62, 1954.

UNITED STATES PATENT OFFICE
CERTIFICATE OF CORRECTION

Patent No. 2,976,206                          March 21, 1961

Edward C. Baillie et al.

It is hereby certified that error appears in the above numbered patent requiring correction and that the said Letters Patent should read as corrected below.

Column 2, line 60, before "size" insert -- particle --; column 3, line 10, for "surfur" read -- sulfur --; line 36, for "of", second occurrence, read -- and --; column 4, in the table under the heading "Fungicidal treatment-Fungicide and rate", first line thereof, for "Sjmixture" read -- S-mixture --.

Signed and sealed this 12th day of December 1961.

(SEAL)
Attest:

ERNEST W. SWIDER                      DAVID L. LADD
Attesting Officer                      Commissioner of Patents

USCOMM-DC